2 Sheets--Sheet 1.

C. O. GARDINER.
Seeding-Machines.

No. 153,559. Patented July 28, 1874.

Witnesses:
H. H. Dodge
P. P. Mast

Inventor:
C. O. Gardiner
By his attys
Dodge & Son

C. O. GARDINER.
Seeding-Machines.
No. 153,559. Patented July 28, 1874.
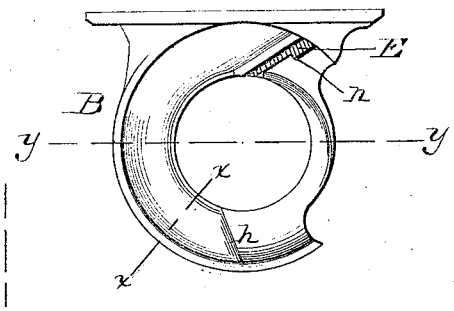
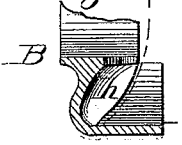
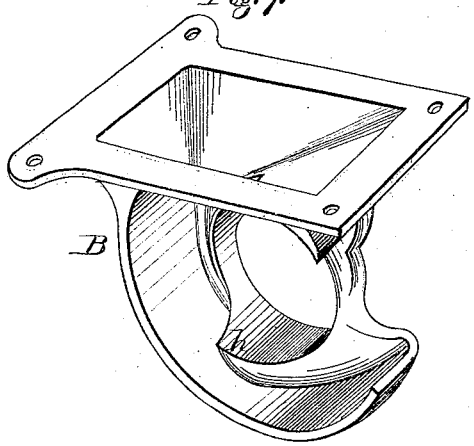
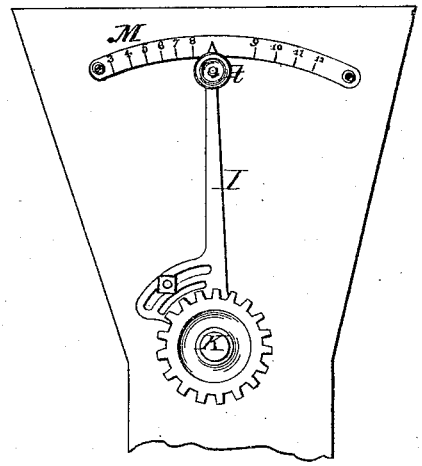
Witnesses:
H. H. Dodge
O. P. Mast
Inventor
C. O. Gardiner
By his attys
Dodge & Son

UNITED STATES PATENT OFFICE.

CHARLES O. GARDINER, OF SPRINGFIELD, OHIO, ASSIGNOR TO P. P. MAST & CO., OF SAME PLACE.

IMPROVEMENT IN SEEDING-MACHINES.

Specification forming part of Letters Patent No. 153,559, dated July 28, 1874; application filed May 15, 1874.

*To all whom it may concern:*

Be it known that I, CHARLES O. GARDINER, of the city of Springfield, in the county of Clarke and State of Ohio, have invented certain Improvements in Seeding-Machines, of which the following is a specification, reference being had to the accompanying drawings.

My invention relates to that class of feeders which consist of a vertical disk or wheel mounted in a feed cup or case in such manner that the grain is fed between the side or face of the disk and that of the cup.

The invention consists in constructing the parts substantially as hereinafter described, so that the face of the disk and that of the cup may be separated to any desired extent, in order to change the rate of feed without changing the speed of the disk, and to adapt the machine for feeding different grain. The invention also further consists in a peculiar construction of the disk or wheel and the cup or case, in a peculiar arrangement of devices for adjusting the disk laterally, and in other details, as hereinafter explained.

Figure 1:
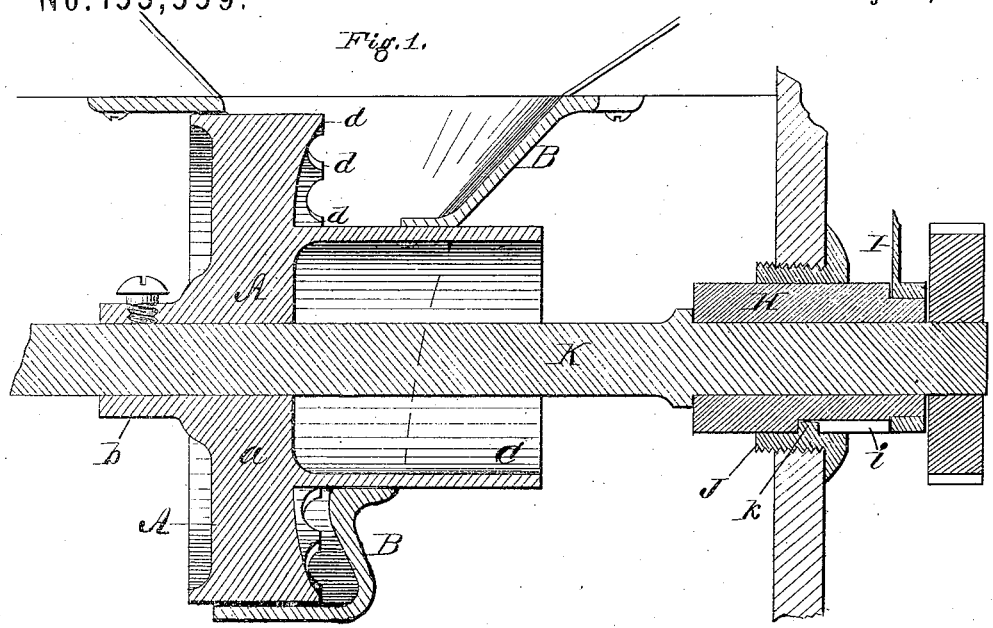
Figure 2:
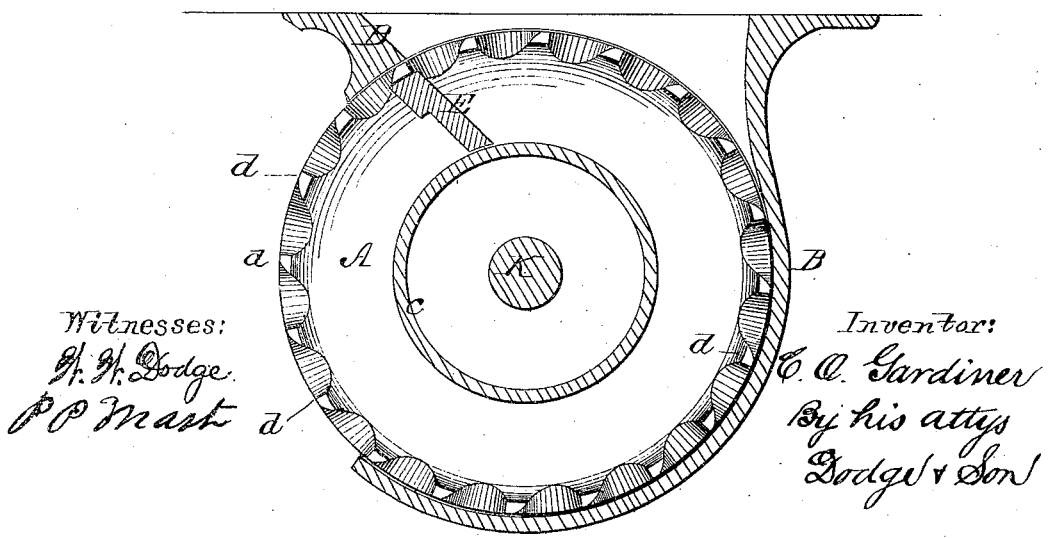

Figure 1 is a longitudinal vertical section through the center of my feed; Fig. 2, a transverse vertical section, shown on line *y y;* Fig. 3, an inside face view of the feed cup or case; Fig. 4, a section of same; Fig. 5, a horizontal cross-section of the cup. Fig. 6 is a side detail view, and Fig. 7 a perspective view, of the cup, showing the gage-point.

In constructing my device, I first provide the feeding disk or wheel A, of the form shown in Figs. 1 and 2, consisting of a circular plate or body, *a,* having a small central hub, *b,* on the outer side, a large central cylindrical hub, C, on the inner side or face, and a series of teeth, *d,* on the inner face around the outer edge, as shown. The large hub C is cored out, as shown, in order to render the wheel as light as possible, while the small hub is made of the proper size to receive the supporting and driving shaft K, on which the wheel is mounted. The inner face or side of the disk or wheel is made slightly concave, as shown in Fig. 1. The teeth *d* are made of the peculiar form shown, narrowing down in cross-section toward their own edges, as shown in Fig. 1, and made more abrupt on their front than on their rear faces, as shown in both Figs. 1 and 2. The outside faces of both the disk or wheel and its large hub are made cylindrical, as shown. Having thus constructed the feeding-wheel, I mount it in a feed cup or case, B, made of a cylindrical form in its interior, open on one side to admit the disk or wheel, and with a flaring top or hopper, as usual, to receive the grain, and form a means of attachment to the hopper of the machine. The cup is made to fit closely around the periphery of the disk or wheel, and is provided in its inner closed side with a hole, through which the large hub of the disk extends, as shown. A space or passage is left between the inner face or side of the disk or wheel and the inner side face of the cup, to permit the passage of the grain, which is carried down on the front side of the disk, between it and the side of the cup, and discharged at the rear, the flange or rim of the cup being cut away at the rear, as usual, to form a discharge-opening. The cup is made of such form in its interior that a large but gradually narrowing passage or pocket is left at the front, between the wheel and the face of the cup, from the top downward to a point nearly below the center, at which point the cup has on its face a shoulder, *h,* which extends inward toward the face of the wheel, and reduces the size of the passage or opening from said point to the discharge-opening at the rear. The form and position of this shoulder are clearly shown in Figs. 3, 4, and 5. In its vertical cross-section it inclines outward at its top toward the disk or wheel, as shown in Fig. 4, which represents a section taken on the line *x x* of Fig. 3. It will thus be seen that the side face of the shoulder and the inside face of the disk or wheel are nearly parallel with each other. In its side or face elevation the front of the shoulder inclines downward and backward, as clearly shown in Fig. 3, or, in other words, it stands tangentially. In looking down upon the shoulder from above, it inclines backward as it approaches the disk or wheel, as shown in Figs. 4 and 7. The objects of thus beveling the shoulder backward on all sides are, first, to prevent the grain from catching between the wheel and shoulder and being crushed or broken; and, secondly, to facilitate the feeding of the grain into and through the contracted portion of the space or outlet. When the device is in operation and the wheel turning forward, the grain passes down freely in the front passage or pocket, between the wheel and the face of the cup, to the shoulder, when it is carried back by the teeth between the wheel and the shoulder, and discharged at the rear. The construction and arrangement of the parts are such that the wheel or disk can be moved sidewise in the cup, and thus the distance between its face and that of the cup increased or diminished at will. It is by this separation of the two faces that the rate of feed is increased and diminished, and the machine adapted for feeding different kinds of grain. The speed of the wheel or disk need never be varied or changed. The rate of feed may be controlled perfectly by the change of distance between the faces of the wheel and cup.

It is of course evident that the same result would be accomplished by moving the face of the cup instead of the wheel, the only requisite being that the distance between the two vertical faces, and thereby the size of the grain-passage, be increased or diminished, as occasion requires; and it is this feature that forms the most important part of my invention.

When the wheel or disk receives its lateral adjustment, the large hub slides in or out, as the case may be, and keeps the center of the cup closed.

In order to prevent the grain from escaping over the rear of the wheel, I employ a cut-off plate, E, in the cup, as shown in Figs. 2 and 3. This plate is arranged to move laterally with the wheel, so as to retain its relative position thereto.

In order to provide for the lateral adjustment of the wheel and cut-off, I secure the former rigidly on its driving-shaft, and mount on the end of the latter a sleeve or collar, H, which is so arranged that it can rotate, but not move laterally on the shaft, as shown in Fig. 1.

I provide the sleeve with an arm or lever, I, and with an oblique groove or thread, i, in its outer surface, and mount it in a collar, J, which has a stud, k, fitting into the groove or thread, as shown in Fig. 1. When, therefore, the sleeve H is turned by means of its arm I, it is caused, by the stud and groove, to move laterally, and thereby move the shaft endwise and give the lateral adjustment to the wheel. The slide or cut-off is also moved by this lever, which is provided with a concentric groove, in which the end of the slide is loosely secured, as shown in Fig. 7. On the end of the hopper, under the end of arm I, I place a metal scale, to indicate the rate of feed when the arm is in its different positions. I also provide the arm with a thumb-screw and clip, engaging with the scale edge, by which it is locked fast.

In constructing a machine, the whole series of wheels are secured upon the one driving-shaft, and all the slides or cut-offs connected to a single slide, so that when the arm or lever I is moved, it adjusts the entire series of wheels and slides equally and at the same time.

In order to give the cut-off slide support and prevent it from scraping on the face of the wheel, I make it with a longitudinal shoulder or rib, n, which bears on a corresponding shoulder in the cup, as shown in Figs. 2 and 3. These shoulders give the slide support, and take its weight entirely from the wheel.

It is obvious that, instead of having the end of the rod that operates the slide E engage in the slot in lever I, the slot may be omitted, the lever being left whole at that point, and the end of the rod made to bear against the inner face of the lever instead of in the slot, in which case the moving of the lever will move the slide in one direction, while its movement in the opposite direction will be effected by the feed-wheel's bearing against the opposite end of the slide E as the lever is reversed.

In constructing the cup, I propose to cut away the shoulder more or less toward the rear, in order to widen the discharge-passage and permit a free escape of the grain after it passes the front of the shoulder. By thus cutting away the shoulder and giving clearance, the grain is prevented from choking and the delivery of grain rendered very regular.

It will be seen that the main purpose of the shoulder is to serve as a cut-off or gage to control the discharge of grain, which is governed by the distance between the front edge of the shoulder and the inner face of the wheel. It will also be noted that, owing to the peculiar form of the shoulder or gage-point, it tends to force the grain down in contact with the teeth of the wheel.

While the form and construction of the details shown and described are considered the best, it is obvious that they may be varied somewhat.

Having described my invention, what I claim is—

1. A force-feed for grain-drills, consisting of a vertically-revolving concave disk or wheel, A, mounted within the cup or case B, one side of said cup being left open of the full diameter of the wheel, and the opposite side having a central opening for the hub of the wheel only, so that the wheel may be adjusted laterally with reference to the case to regulate the feed, the whole being constructed to operate substantially as described.

2. In combination with the case B, the laterally-adjustable feed-wheel A, provided with the teeth d on its side at the outer edge, facing the vertical roll of the case B, substantially as shown and described.

3. In combination with the feed cup or case having its side provided with the central opening, the vertical laterally-adjustable feed wheel or disk A, provided with the hub c, and mounted in the cup, as shown, so that the grain is fed between the side faces of the cup and wheel, as set forth.

4. The feed-cup B, having the internal shoulder or gage-point h, shaped and arranged to operate substantially as described.

5. In combination with the feed-wheel A and driving-shaft K, the sleeve H, mounted loosely on the shaft and provided with the spiral thread or slot i and the fixed stud k bearing in the thread or slot, as shown, so that, by turning the sleeve, the shaft and feed-wheel are moved laterally.

6. The slide E, in combination with the lever I and the laterally-adjustable wheel A, all constructed and arranged to operate substantially as described.

7. In combination with the shaft K and its threaded sleeve H, having the arm I attached, the spirally-curved scale M, shaped to conform to the circular and lateral movement of the arm.

CHARLES O. GARDINER.

Witnesses:
A. P. LINN COCHRAN,
ROBERT C. RODGERS.